United States Patent [19]

Haven

[11] Patent Number: 5,048,617
[45] Date of Patent: Sep. 17, 1991

[54] HAND-HELD TILLER MACHINE

[76] Inventor: Robert M. Haven, 204 E. Emma, Lafayette, Colo. 80026

[21] Appl. No.: 507,849

[22] Filed: Apr. 12, 1990

[51] Int. Cl.⁵ .................................................. A01B 35/00
[52] U.S. Cl. ....................................... 172/42; 172/62; 172/95; 172/116; 172/80
[58] Field of Search ............... 172/41, 42, 43, 21, 172/60, 61, 62, 77, 80, 84, 85, 91, 92, 95, 96, 97, 101, 103, 116, 117, 125

[56] References Cited

U.S. PATENT DOCUMENTS

| | | | |
|---|---|---|---|
| 22,496 | 1/1859 | Field | 172/89 |
| 116,297 | 6/1871 | Gibes | 172/94 |
| 321,919 | 7/1885 | Stone | 172/62 |
| 357,841 | 2/1887 | Lubin | 172/96 X |
| 874,286 | 12/1907 | Bassett | 172/62 |
| 1,066,172 | 7/1913 | Adkison | 172/80 X |
| 1,309,969 | 7/1919 | Sterry | 172/88 |
| 1,479,188 | 1/1924 | Larson | 172/54 |
| 1,732,496 | 10/1929 | Brundige | 172/89 |
| 1,751,694 | 3/1930 | Glasier | 172/43 |
| 1,802,485 | 4/1931 | Smith | 474/115 |
| 2,056,337 | 10/1936 | Archibald | 172/21 |
| 2,659,285 | 11/1953 | Burr | 172/42 |
| 2,750,859 | 6/1956 | Smithburn | 172/42 |
| 2,991,838 | 7/1961 | Lane | 175/221 |
| 3,199,235 | 8/1965 | Stacey | 37/43 |
| 3,204,704 | 9/1965 | Goette | 172/41 |
| 3,710,870 | 1/1973 | Pfeiffer | 172/41 X |
| 3,878,899 | 4/1975 | Jones | 172/61 X |
| 3,921,373 | 11/1975 | Rubin | 56/16.6 |
| 4,049,059 | 9/1977 | Weibling | 172/15 |
| 4,096,915 | 6/1978 | Groth | 172/42 |
| 4,305,470 | 12/1981 | Anderson | 172/41 |
| 4,607,704 | 8/1986 | Kepes | 172/42 |
| 4,632,189 | 12/1986 | Rizzo | 172/95 X |
| 4,662,456 | 5/1987 | Classen | 172/22 |
| 4,811,794 | 3/1989 | Greene | 172/43 |

FOREIGN PATENT DOCUMENTS

| | | | |
|---|---|---|---|
| 2495529 | 6/1982 | France | 172/41 |
| 425564 | 4/1974 | U.S.S.R. | 172/60 |

Primary Examiner—David H. Corbin
Assistant Examiner—Jeffrey L. Thompson
Attorney, Agent, or Firm—John E. Reilly

[57] ABSTRACT

A hand-held tiller is adapted for use in loosening and breaking up the soil and is made up of a skid, an elongated handle extending forwardly of the skid with a drill motor at one end of the handle which is drivingly connected into a power transmission drive for operating a crank having a plurality of crank arms and vertically extending tines, the tines being sequentially driven by reciprocation of the crank arms into and out of the soil as the machine is drawn behind the operator.

17 Claims, 3 Drawing Sheets

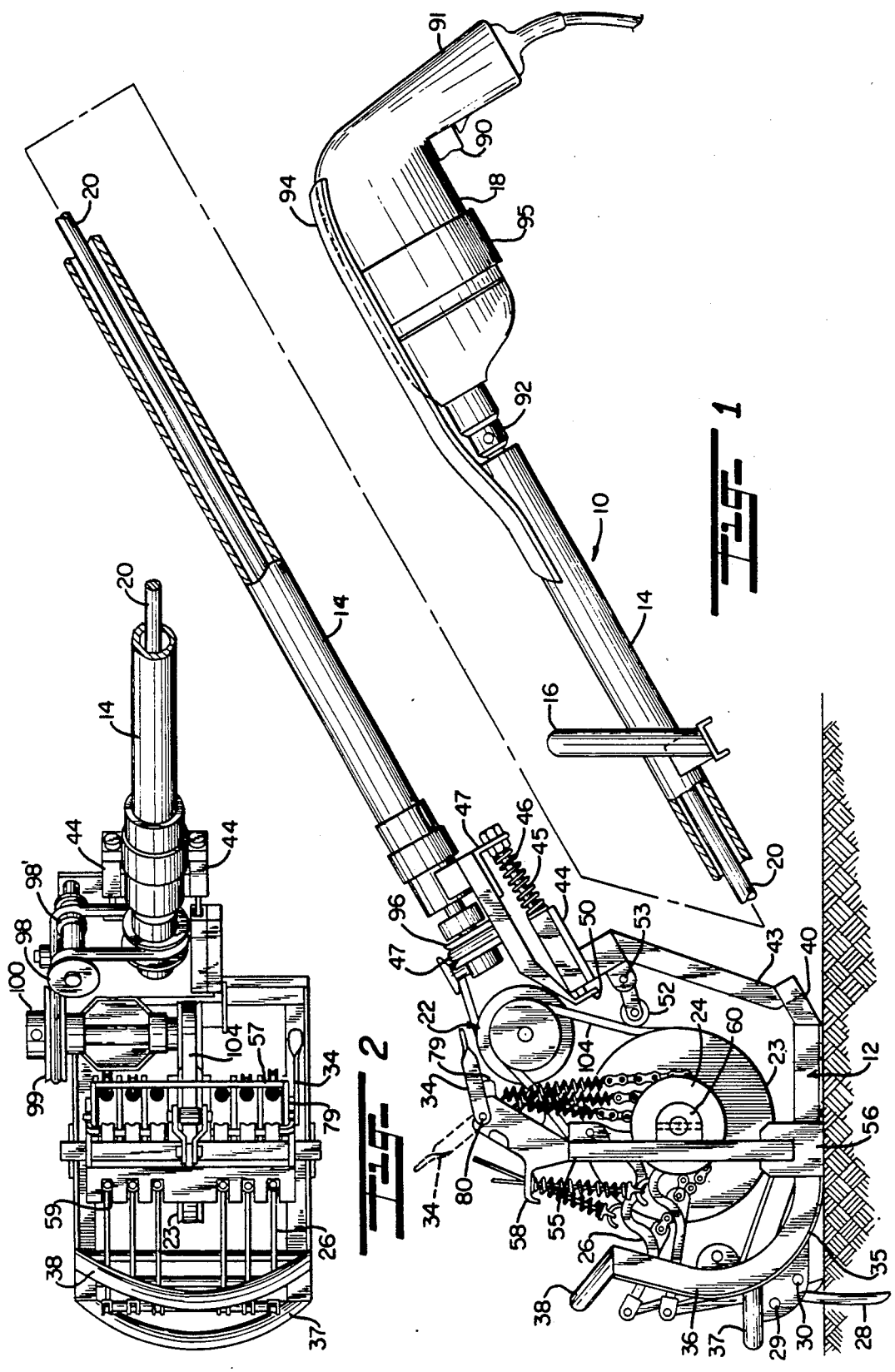

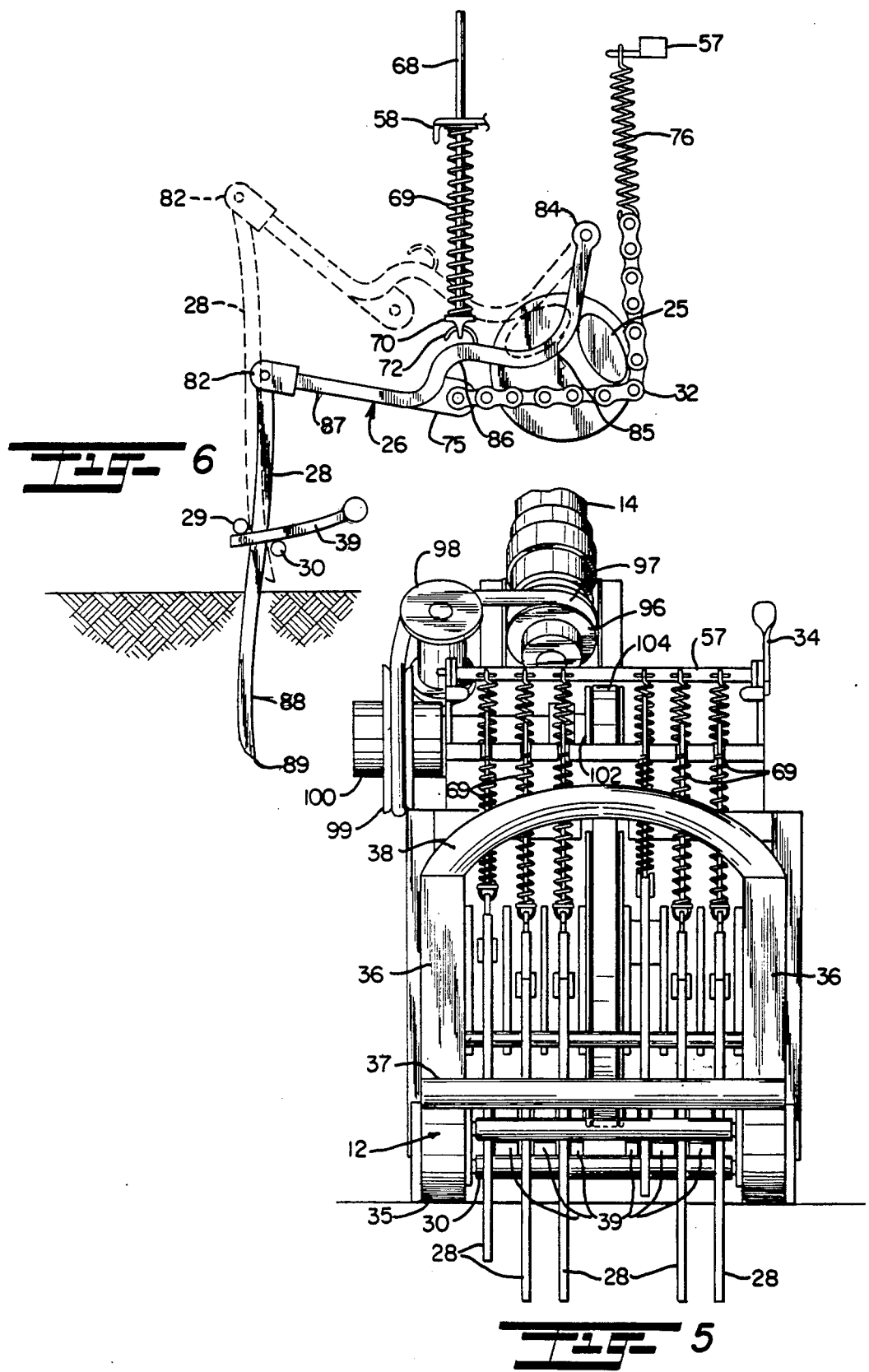

HAND-HELD TILLER MACHINE

This invention relates to soil cultivating apparatus; and more particularly relates to a novel and improved hand-held machine which is adaptable for use in tilling or otherwise perforating or aerating the soil.

BACKGROUND AND FIELD OF THE INVENTION

Cultivating apparatus of the type described typically utilize a series of tines that are reciprocated into and out of the soil at predetermined intervals as the apparatus is advanced along the ground. Such apparatus may either be self-propelled or hand-drawn and a suitable source of motive power, such as, an internal combustion engine or electric motor is employed to reciprocate the tines through a power transmission drive. For example, U.S. Pat. No. 2,991,838 to Lane, No. 4,049,059 to Weibling and No. 4,305,470 to Anderson disclose hand-drawn tilling devices utilizing a power drill at one end of a handle for advancing the apparatus and which transmits power through an elongated shaft in the handle into a power transmission system, such as, a V-belt drive. U.S. Pat. No. 3,199,235 to Stacy is directed more to a hand-held snow blower which is supported on a skid for advancement over a surface to be cleared of snow.

U.S. Pat. No. 2,056,337 to Archibald discloses a tilling apparatus having a plurality of tines that are arranged in pairs and reciprocated by a crankshaft through openings in a bar into and out of the soil. The motion of the tines is not purely reciprocal but instead is in a generally ovate path whereby the successive advancement of the tines into the soil will result in propelling the device while at the same time loosening the soil. Other representative patents in this field are those to Reuben No. 3,921,373 and Classen No. 4,662,456.

A number of problems and drawbacks in the prior art can be overcome by devising a soil tiller which has a plurality of reciprocating tines mounted at the free ends of crank arms for sequential, vertically reciprocal motion in response to rotation of a crank. The driving force of the tines is adjustable to conform to the condition of the soil and the entire mechanism can be carried on a skid which is driven behind an operator so that the operator can adjustably control the attitude of the skid and angle of approach of the tines into the soil.

SUMMARY OF THE INVENTION

It is therefore an object of the present invention to provide for a novel and improved soil tilling apparatus which is highly efficient and dependable in operation.

It is another object of the present invention to provide for a novel and improved hand-drawn tilling device which is of simplified construction with minimal power requirements and is readily adjustable in driving force to conform to variable conditions of the soil being tilled.

It is a still further object of the present invention to provide in earth tilling apparatus for a novel and improved mounting and construction of a series of reciprocal tines for sequential advancement into the soil in such a way as to most efficiently cultivate the soil while at the same time assisting in advancement of the apparatus across the area to be tilled.

It is an additional object of the present invention to provide for a novel and improved earth tilling apparatus which can be hand-drawn, is capable of breaking up the soil into a fine, uniform consistency and is readily adaptable for use in limited areas, such as, vegetable gardens or flower beds; and further wherein the apparatus can be driven in one direction only and any attempt to drive it in reverse will cause the drive to be disengaged.

In accordance with the present invention, a preferred form of soil tilling apparatus comprises a skid, a crank member mounted on the skid and power transmission means for rotating the crank, a plurality of crank arms pivotally mounted to extend away from the crank, the crank having cam portions moveable into and out of engagement with the crank arms in response to rotation of the crank member, and a plurality of tines are pivotally connected to free ends of the crank arms for downward extension along a substantially vertical path of movement in response to reciprocal motion of the crank arms. The cam portions are offset with respect to one another for sequential advancement into and out of engagement with their respective crank arms in order to sequentially drive the tines into and out of the soil, and spring-loaded tension members are trained over each of the cam portions to control reciprocal motion of the crank arms in response to rotation of the crank member. The power transmission system includes a clutch release mechanism to selectively disengage the power transmission from the crank in the event that the operator attempts to push the apparatus in the wrong direction.

The above and other objects, advantages and features of the present invention will become more readily appreciated and understood when taken together with the following detailed description of a preferred embodiment of the present invention in conjunction with the accompanying drawings, in which:

BRIEF DESCRIPTION OF THE DRAWINGS

Figure side elevational view of a preferred form of tilling machine in accordance with the present invention and with portions shown in section;

FIG. 2 is top plan view of the lower tiller head of the preferred form of invention shown in FIG. 1;

FIG. 5 is a rear elevational view of the preferred form of machine illustrated in FIG. 1; and FIG. 6 is an enlarged, somewhat fragmentary view illustrating the reciprocal motion of a preferred form of crank arm and tine in response to rotation of the crank, in accordance with the present invention.

DETAILED DESCRIPTION OF PREFERRED EMBODIMENT

Figure 3:
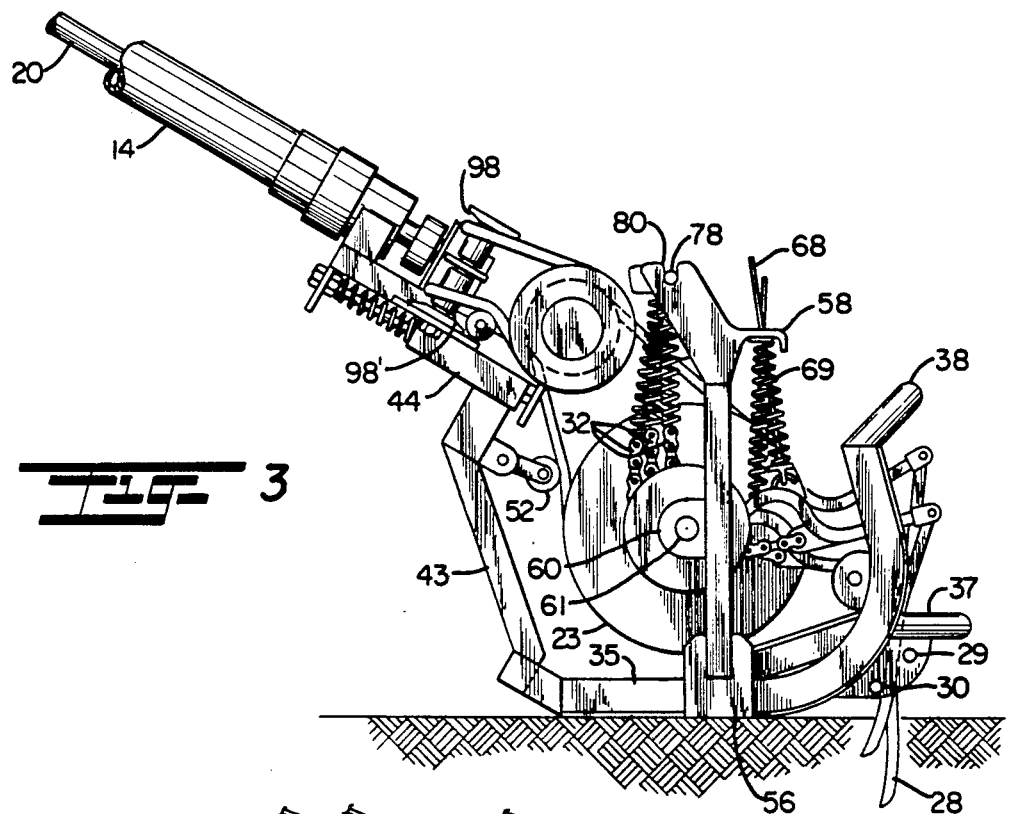
FIG. 3 is a side elevational view of the tiller head of the preferred form of invention shown from a side opposite to that shown in FIG. 1.

Referring in more detail to the drawings, there is illustrated in FIGS. 1 to 6 a preferred form of earth tilling machine 10 which is broadly comprised of a ground-engaging skid 12, an upwardly and forwardly inclined handle 14 including a handle grip 16 and motor drive 18 at the upper end of the handle. A drive shaft 20 extends from the motor 18 through the hollow cylindrical handle 14 into a power transmission belt drive 22 and which through a series of speed reductions imparts rotation to a drive pulley 23 on a crank member 24. The crank 24 is provided with a series of eccentric cam portions 25 to regulate the reciprocal motion of a corresponding number of crank arms 26, and each crank arm is pivotally connected to the upper end of a downwardly directed tine 28. A pair of spaced guide bars 29 and 30 are mounted at the rearward end of the skid to cooperate with the crank arms in guiding the tines 28 into and out of engagement with the soil. Spring-loaded chain sections 32 are trained over the cam portions 25 to drive the crank arms 26 sequentially in an up and down direction, and upper spring tension control arms 34 regulate the degree of force with which the crank arms are driven by the chain sections 32 into the soil.

Considering in more detail the construction and arrangement of parts comprising the present invention, the skid 12 is preferably a rigid, heavy-duty frame having a pair of horizontal runners 35 on opposite sides of the tiller head, each runner curving rearwardly and upwardly into vertically directed portions 36, and vertically spaced, arcuate guard members 37 and 38 rigidly interconnect the portions 36. A support rod also extends between the portions 36 directly behind the guide bars 29 and 30 to support a plurality of fingers 39 which, as shown in FIGS. 5 and 6, extend forwardly through the space between the guide bars 29 and 30 and on opposite sides of each of the tines 28 so as to clear off any mud or dirt from the tines as they are raised out of the soil. Forward ends of the runners 35 have angular extensions 40 and a crossbar 42 interconnects the upper forward ends of the extensions 40. An upwardly extending support bracket 43 has a pair of sleeve members 44 at its upper terminal end on opposite sides of the handle 14. Each sleeve 44 receives a tension rod 45 which is spring-loaded by coil spring 46 between the sleeve 44 and an angular bracket 47 which is attached to the handle 14. The upper end of each tension rod 46 is threadedly adjustable by lock nuts 50 to regulate the degree of tension imposed on the belt drive 22 in a manner to be described and to yieldingly and detachably couple the handle 14 to the skid bracket 43. A belt tensioner on the bracket 43 includes a roller 52 pivotally attached at 53 to one of the bars 43 to engage V-belt 104.

The skid assembly 12 also includes vertical support arms 55 extending upwardly at opposite ends of the crank 24 from rigid connection to a support bracket 56 intermediately of each runner 35. A crossbar 57 extends across upper ends of the support members 55 and to which the tension control arm 34 is connected. A horizontally extending support flange 58 at the upper ends of the bracket 56 is slotted as at 59 at spaced intervals across the length of the flange to support tension rods 68 for the crank arms 26.

Figure 4:
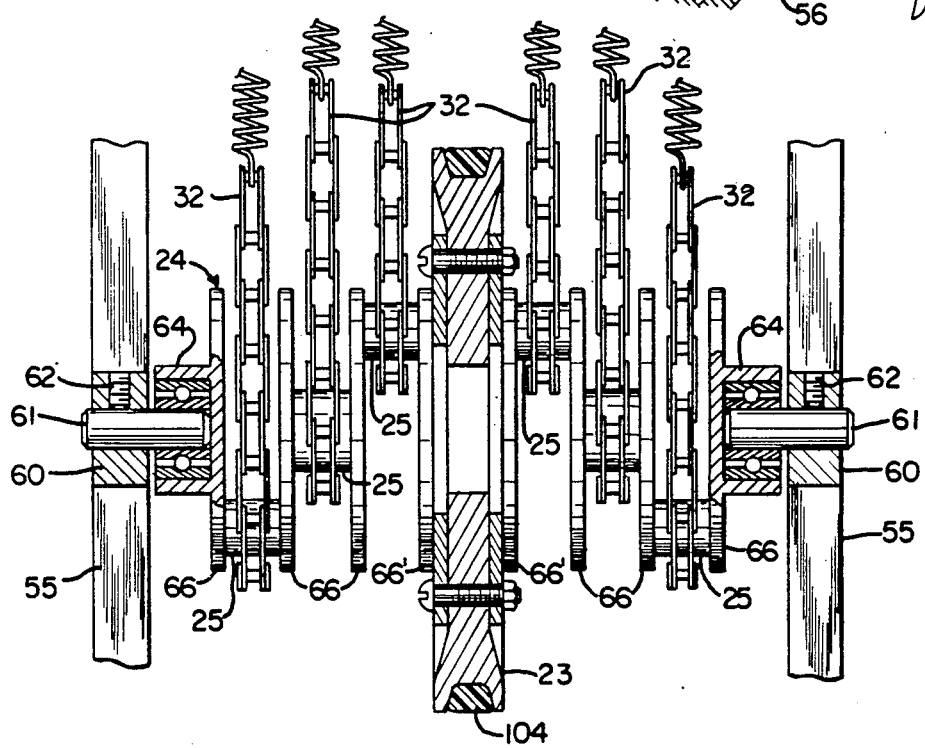
FIG. 4 is a rear view enlarged and partially in section of the preferred form of crank drive employed in the preferred form of invention.

As best seen from FIG. 4, the support arms 55 are provided with aligned sockets 60 for insertion of stub shafts 61 and which are fixed by set screws 62 within the bores and extend horizontally toward one another for insertion into bearings 64 at opposite ends of the crank assembly 24. The preferred form of crank assembly 24 is comprised of spaced, coaxial disks 66, and the cams 25 extend between and are rigidly connected to adjacent disks so that the disks and eccentrics are caused to rotate in unison by the drive pulley 23 and in journaled relation to the stub shaft 60. Preferably, the drive pulley 23 is interposed between the centermost disks 66' with inner facing surfaces of the disks 66' welded or otherwise securely affixed to opposite sides of the pulley 23.

The eccentric portions or cams 25 are, as best seen from FIG. 6, of elliptical configuration, there being a series of three eccentric cam portions 25 on either side of the drive pulley 23. The eccentric portions on either side are arranged at equally spaced circumferential intervals or in other words 120° apart and their width is such as to readily accommodate the chain sections 32 between the disks 66. Thus, as the crank assembly is rotated by the drive pulley 23 and, assuming that the rotation is in a counterclockwise direction when viewed in the relationship shown in FIG. 6, the cams 25 will engage a respective crank arm through the upper half of each revolution. In this way, each crank arm is advanced from a position shown in full to the dotted position as illustrated in FIG. 6 to drive an associated tine 28 upwardly; and through the lower half of each revolution will exert tension on the chain section 32 to draw the crank arm 26 downwardly until it returns to the position shown in full. The downward advancement or return of the crank arm 26 is aided by a spring-loaded tension arm 68 having a coil spring 69 disposed between a lower end stop 70 and the upper crossbar 58. Thus each rod 68 extends upwardly through one of the slotted portions 59, and the lower end of each rod includes a hook end portion which engages a hook portion 72 on the upper surface of a crank arm 26.

Each chain section 32 is made up of a plurality of chain links 74 with a lower free end of each chain section attached to a lobe 75 on an associated crank arm, and the opposite free end of the chain section is attached to a coil spring 76. The coil springs 76 extend upwardly for attachment to the crossbar 57 which is connected to pivot arms 79 extending forwardly from pivot pins 80 at opposite ends of the crossbar 57. The control arm 34 is connected to one of the pivots 80 so that upward movement of the arm 34 about the pivot 80 to the dotted line position shown in FIG. 1 will lift the crossbar 57 to increase the tension on the spring elements 76 and attached chain sections 32.

Each of the crank arms 26 includes a pivot link 82 at its rearward end for pivotal connection of an associated tine 28. In turn, a fixed pivot 84 at the upper forward end of each arm 26 has an upper curved camming section 85 which is engaged by the cam 25 and an intermediate offset portion 86 leading into a more nearly horizontal section 87 which terminates in the pivot link 82. The offset portion 86 establishes clearance between the chain and the crank arm as the arm is reciprocated about the fixed pivot 84.

Each of the tines 28 is correspondingly shaped to be of elongated slender configuration with a slight downward and forward curvature at its lower end 88, and each tine terminates in a sharpened edge 89 for penetrating the earth. In this relation, the tines 28 are curved in the direction of intended travel of the skid and as each progressively enters the earth or soil will by virtue of its angle of approach exert a force tending to self-propel the machine. It should be emphasized that the full and silhouetted positions shown in FIG. 6 do not represent the extreme end limits of movement of the crank arm and particularly that shown in full.

It will be evident that various means of power transmission can be utilized in driving the mechanism of the present invention. However, in the preferred form a hand drill 18 includes the standard trigger mechanism 90, handle grip 91 and chuck 92. The chuck 92 receives the upper end of the drive shaft 20 and is mounted in the upper end of the tubular handle 14 and clampingly supported by a retainer bracket 94 with a circular band 95 which encircles the body of the drill motor 18 and the retainer bracket 94. The lower end of the drive shaft 20 is keyed into a suitable drive coupling which includes a pulley 96 for an endless round belt 97. As a part of the drive unit 22, the belt 97 is trained over the pulley 96 and over grooved idlers 98 and 98' at right angles to the drive shaft 20, then over a larger pulley 99 on a take-off drive shaft 100. A second pulley 102 is mounted at the opposite end of the take-off drive shaft 100 in alignment with the crank drive pulley 23, and an endless V-belt 104 extends from the pulley 102 over the pulley 23. Any desired speed reduction may be established according to the size of the machine and motor capacity. For instance, for a hand drill 18 having a maximum rpm of 1200, the speed reduction from the drive shaft 20 into the takeoff drive crank drive pulley 23 is on the order of a 6:1 ratio.

In use, the machine is designed to be drawn behind the operator so as to avoid walking on or tamping down the loosened soil. Moreover, in placing the operator in front of the unit minimizes any danger of loose rocks or other foreign particles striking the operator. In fact, should the operator attempt to advance the machine in the opposite direction, the pressure exerted on the tines as they penetrate the ground will cause the bracket 47 to advance the rods 45 through the sleeve 44 and in so doing the take-off drive shaft 100 will shift forwardly toward the drive pulley 23 thereby removing any tension on the V-belt and effectively disengage the belt from the drive pulley. In this respect, the tiller is unidirectional and the crank will operate only when advanced or drawn behind the operator. Although the machine may be wheel-mounted, the skids or runners 35 afford a firm base for advancing the machine along the ground surface and can be tilted or adjusted according to the depth of penetration desired without the aid of wheels. Depending upon the condition of the soil, the tension control arm 34 may be pivoted about the pivot pins 80 past center into a forwardly inclined position, as shown dotted in FIG. 1, thereby increasing the tension on the crank arms 26 in a direction to increase the downward force of the tines 28 into the soil.

It will be evident that the synchronization of the tines in penetrating the soil may be varied by staggering the position of the eccentrics 25 across the length of the crank. For example, for a series of six eccentrics or cams circumferentially staggered at 60° intervals, each tine in succession may be individually driven into the soil for each revolution of the crank; or as illustrated may be synchronized so that one tine on either side of the crank or a pair of tines are simultaneously driven into the soil. In this connection, while the cam portions have been illustrated as being of generally elliptical configuration, other configurations, such as, circular may be utilized to accomplish the same end. Also, other flexible cord-like members may be utilized in place of the chain sections to exert the desired tension on the crank throws 26. For the purpose of illustration but not limitation, for a tine having a total length of 6" the distance of travel into the soil may be on the order of 1.5" to 2.5" for optimum penetration and loosening of the soil for gardening applications.

It is therefore to be understood that while a preferred embodiment of the present invention is herein set forth and described, various modifications and changes may be made without departing from the spirit and scope of this invention as defined by the appended claims.

I claim:

1. Soil tilling apparatus comprising:
a skid;
a crank;
power transmission means for imparting rotation to said crank;
a plurality of crank arms pivotally mounted for extension in a substantially horizontal direction away from said crank, said crank having cam portions movable into and out of engagement with said crank arms in response to rotation of said crank whereby to impart vertical reciprocal motion to said crank arms, a spring-loaded tension member trained over each of said cam portions and connected to each of said crank arms to cooperate with said cam portions in controlling reciprocal motion of said crank arms in response to rotation of said crank; and
a plurality of tines pivotally connected to free ends of said crank arms for downward extension therefrom, and guide mans for controlling the directional movement of said tines along a substantially vertical path in response to reciprocal motion of said crank arms.

2. Apparatus according to claim 1, said cam portions being circumferentially offset with respect to one another for sequential advancement into and out of engagement with their respective crank arms whereby to sequentially drive said tines into and out of the soil.

3. Apparatus according to claim 1, each of said tines being of elongated slender configuration and having a lower curved end portion.

4. Apparatus according to claim 1, said skid having a pair of lower horizontally extending runners spaced beneath said crank, said runners curving upwardly on opposite sides of said tines, and said guide means including a pair of spaced guide bars extending between said upwardly extending portions of said runners.

5. Apparatus according to claim 1, each of said crank arms including means yieldingly urging said crank arms in a downward direction.

6. Apparatus according to claim 1, a handle extending upwardly and forwardly from said skid, motor drive means on said handle including a drive shaft extending from said motor drive means through said handle for driving connection into said power transmission means, and coupling means yieldably connecting said handle to said skid.

7. Apparatus according to claim 6, said power transmission means including speed reducer means, a drive wheel on said crank, and said coupling means selectively disengaging said shaft and said speed reducer means from said drive wheel.

8. Hand-drawn soil tilling apparatus comprising:
a skid;
a crank;
power transmission means for imparting rotation to said crank including hand-drawn motor drive means extending forwardly from said skid;
a plurality of crank arms pivotally mounted for extension in a rearward direction away from said crank, said crank having eccentric cam portions movable into and out of engagement with said crank arms in response to rotation of said crank whereby to impart vertical reciprocal motion to said crank arms;
a plurality of tines pivotally connected to rearward ends of said crank arms for directional movement along a substantially vertical path in response to reciprocal motion of said crank arms; and
said skid having a pair of lower horizontally extending runners curving upwardly and rearwardly, and guide means including a pair of spaced guide bars extending between said upwardly and rearwardly extending runners for controlling the directional movement of said tines.

9. Apparatus according to claim 8, said eccentric cam portions being circumferentially offset with respect to one another for sequential advancement into and out of engagement with their respective crank arms whereby to sequentially drive said tines into and out of the soil, each of said tines being of elongated slender configuration and each having a lower, forwardly curved end portion.

10. Apparatus according to claim 9, wherein each of said tines is pivotally connected to a rearward end of one of said crank arms and a plurality of fingers extend rearwardly between said tines.

11. Apparatus according to claim 8, a spring-loaded chain member trained over each of said eccentric cam portions for connection to each of said crank arms and cooperating with said eccentric cam portions to yieldingly urge said crank arms in a downward direction.

12. Apparatus according to claim 11, including means for adjusting the degree of force imparted by said chain members in urging said crank arms in a downward direction.

13. Apparatus according to claim 11, each of said crank arms including a first curved portion engageable with said eccentric cam portion and a second offset portion connected to one of said spring-loaded chain members.

14. Apparatus according to claim 8, including clutch release means interconnecting said handle and said skid whereby resistance to movement of said skid in a rearward direction will disengage said power transmission means from said crank.

15. Apparatus according to claim 8, a handle extending upwardly and forwardly from said skid, said motor drive means including a drive shaft extending from said motor drive means through said handle for driving connection into said power transmission means.

16. Hand-drawn soil tilling apparatus comprising:
a skid;
a crank;
power transmission means for imparting rotation to said crank including hand-drawn motor drive means extending forwardly from said skid;
a plurality of crank arms pivotally mounted for extension in a rearward direction away from said crank, said crank having eccentric cam portions movable into and out of engagement with said crank arms in response to rotation of said crank whereby to impart vertical reciprocal motion to said crank arms;
a spring-loaded chain member trained over each of said eccentric cam portions for connection to each of said crank arms and cooperating with said eccentric cam portions to yieldingly urge said crank arms in a downward direction; and
a plurality of tines pivotally connected to rearward ends of said crank arms for directional movement along a substantially vertical path in response to reciprocal motion of said crank arms.

17. Hand-drawn soil tilling apparatus comprising:
a skid;
a crank;
power transmission means for imparting rotation to said crank including hand-drawn motor drive means extending forwardly from said skid;
a plurality of crank arms pivotally mounted for extension in a rearward direction away from said crank, said crank having eccentric cam portions movable into and out of engagement with said crank arms in response to rotation of said crank whereby to impart vertical reciprocal motion to said crank arms; and
a plurality of tines pivotally connected to rearward ends of said crank arms for directional movement along a substantially vertical path in response to reciprocal motion of said crank arms, said eccentric cam portions being circumferentially offset with respect to one another for sequential advancement into and out of engagement with their respective crank arms whereby to sequentially drive said tines into and out of the soil, each of said tines being of elongated slender configuration and each having a lower forwardly curved end portion, and wherein each of said tines pivotally connected to a rearward end of one of said crank arms and a plurality of fingers extending rearwardly between said tines.

* * * * *